United States Patent
Partington et al.

(10) Patent No.: US 8,832,124 B2
(45) Date of Patent: Sep. 9, 2014

(54) BIOMETRIC MATCHING ENGINE

(71) Applicant: Accenture Global Services Limited, Dublin (IE)

(72) Inventors: Alastair Ross Partington, Hatfield (GB); Per Anders Matteus Astrom, Antibes (FR); Cyrille Bataller, Mougins (FR)

(73) Assignee: Accenture Global Services Limited, Dublin (IE)

( * ) Notice: Subject to any disclaimer, the term of this patent is extended or adjusted under 35 U.S.C. 154(b) by 45 days.

(21) Appl. No.: 13/644,056

(22) Filed: Oct. 3, 2012

(65) Prior Publication Data
US 2013/0086090 A1    Apr. 4, 2013

(30) Foreign Application Priority Data
Oct. 3, 2011   (EP) .................................. 11306279

(51) Int. Cl.
*G06F 17/30*   (2006.01)
*G06K 9/00*   (2006.01)

(52) U.S. Cl.
CPC ............ *G06K 9/00973* (2013.01); *G06F 17/30* (2013.01)
USPC ............ 707/754; 707/758; 382/115; 382/117

(58) Field of Classification Search
CPC ......... G06F 21/31; G06F 21/32; G06F 21/42; G06K 9/00; G06K 9/00006; G06K 9/00067; G06K 9/00087; G06K 9/00107; G06K 9/00597; G06K 9/00885; G06K 9/00892; H04L 9/3231
USPC ............................ 707/754, 758; 382/115, 117
See application file for complete search history.

(56) References Cited

U.S. PATENT DOCUMENTS

| | | | | |
|---|---|---|---|---|
| 4,047,154 A | * | 9/1977 | Vitols et al. | 382/125 |
| 4,253,086 A | * | 2/1981 | Szwarcbier | 382/126 |
| RE30,580 E | * | 4/1981 | Goldman et al. | 340/5.86 |
| 4,821,118 A | * | 4/1989 | Lafreniere | 348/156 |
| 5,040,223 A | * | 8/1991 | Kamiya et al. | 382/127 |
| 5,224,173 A | | 6/1993 | Kuhns et al. | |

(Continued)

OTHER PUBLICATIONS

European Search Report issued in EP11306279 on Mar. 16, 2012.

(Continued)

*Primary Examiner* — Rehana Perveen
*Assistant Examiner* — Thuy Bui
(74) *Attorney, Agent, or Firm* — Harrity & Harrity, LLP

(57) ABSTRACT

The present disclosure concerns a method of identifying a biometric record of an individual in a database (108), the database comprising at least first and second sets of records, each set comprising at least one record, the method comprising: receiving by a processing device (102) at least first and second input biometric samples of said individual; performing on the records of said first set a first matching process comprising a first filtering operation followed by a second filtering operation, and performing on the records of said second set a second matching process comprising said second filtering operation followed by said first filtering operation, wherein said first filtering operation comprises comparing said first input biometric sample to a first reference biometric sample of each record, and said second filtering operation comprises comparing said second input biometric sample to a second reference biometric sample of each record; and identifying a biometric record of said individual based on results of the first and second matching processes.

20 Claims, 4 Drawing Sheets

(56) References Cited

U.S. PATENT DOCUMENTS

| | | | |
|---|---|---|---|
| 2004/0223631 A1* | 11/2004 | Waupotitsch et al. | 382/118 |
| 2005/0238214 A1 | 10/2005 | Matsuda | |
| 2006/0072793 A1* | 4/2006 | Determan | 382/117 |
| 2006/0093190 A1* | 5/2006 | Cheng et al. | 382/115 |
| 2006/0104485 A1 | 5/2006 | Miller, Jr. | |
| 2006/0210119 A1* | 9/2006 | Willis et al. | 382/115 |
| 2007/0201728 A1* | 8/2007 | Monro | 382/117 |
| 2011/0211735 A1 | 9/2011 | Langley | |
| 2012/0300990 A1* | 11/2012 | Hanna et al. | 382/117 |

OTHER PUBLICATIONS

European Search Report issued in EP 11 30 6280 on Mar. 22, 2012.
European Search Report issued in EP1130 6347 on Jan. 30, 2012.
Hong, L., et al., "Integrating faces and fingerprints for personal identification", IEEE Transactions on Pattern Analysis and Machine Intelligence, IEEE Service Center, Los Alamitos, CA, US, vol. 20, No. 12, (Dec. 1, 1998), pp. 1295-1307.
Jain, L.C. (Ed), et al., "Chapter 2 (part): Fingerprint Feature Processing Techniques and Poroscopy in: Intelligent Biometric Techniques in Fingerprint and Face Recognition", (Jan. 1, 1999), Intelligent Biometric Techniques in Fingerprint and Face Recognition, Boca Raton, FL, CRC Press, US, pp. 56-60.
Jain, A.K., et al.,: "Handbook of Biometrics", 2008, Springer Science, New York, US, pp. 12-14.
Jain, A.K. et al.: "Biometrics: Personal Identification in Networked Society", 1999, Kluwer Academic Press, Norwell, US, pp. 18-20, 60-61, 51.
Hiromoto et al., "Partially Parallel Architecture for AdaBoost-Based Detection With Haar-Like Features," IEEE Transactions on Circuits and Systems for Video technology, vol. 19, No. 1, Jan. 2009, pp. 41-52.

* cited by examiner

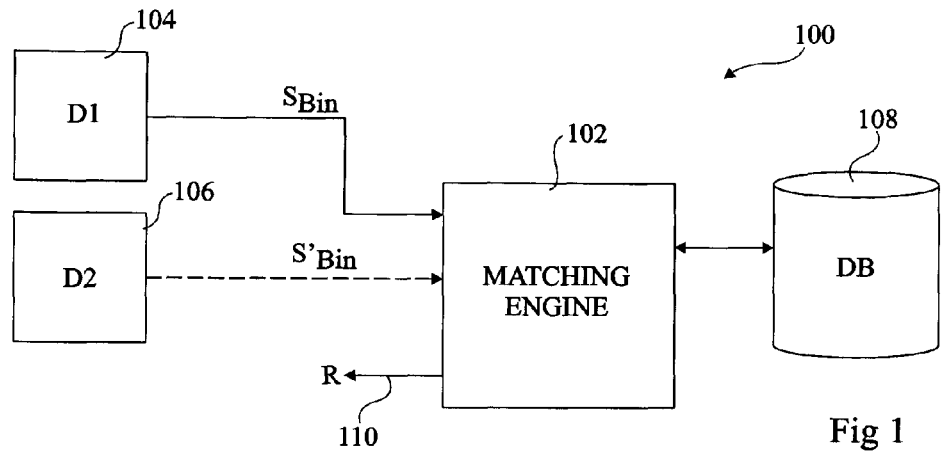
Fig 1
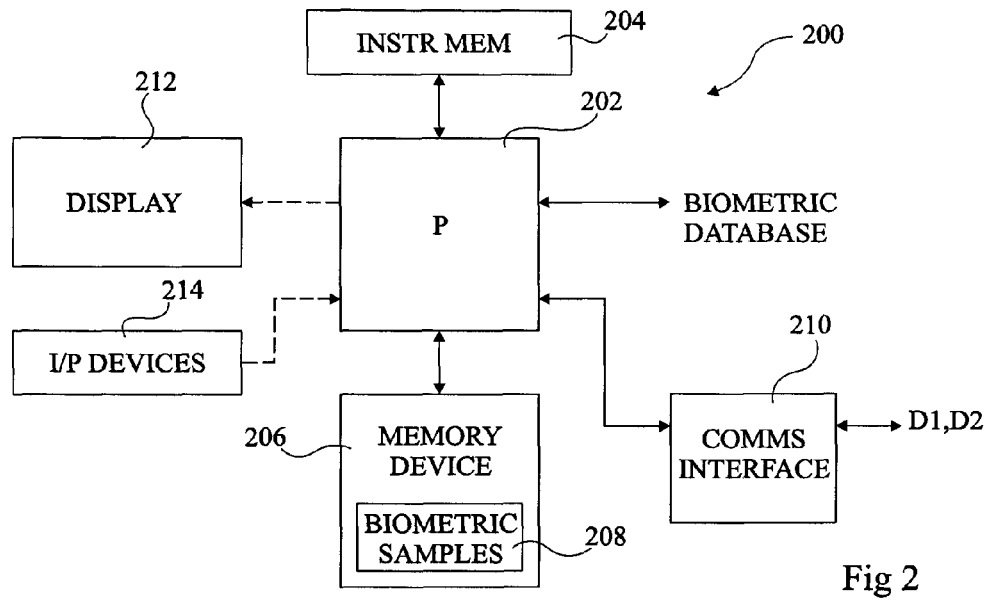
Fig 2
| | 302 | 304 | 306 | 308 | 310 | 300 |
|---|---|---|---|---|---|---|
| | REF | PHOTO OF FACE | FINGER PRINT | IRIS SCAN | SIGNATURE | |
| | 0001 | image 1A | | image 1C | image 1D | |
| | 0002 | image 2A | image 2B | | image 2D | |
| | 0003 | | image 3B | image 3C | image 3D | |
Fig 3

| IMAGE REF | AGE | GENDER | IMAGE SIZE | SHARPNESS | VIEWING ANGLE | CONTRAST | QUALITY SCORE |
|---|---|---|---|---|---|---|---|
| image 1A | 66 | M | 1200 x 1600 | 8 | 5° | 11 | 9 |
| image 1B | 66 | M | 240 x 360 | 9 | — | 8 | 8 |
| image 2A | 13 | F | 600 x 800 | 6 | -10° | 15 | 5 |

| IMAGE REF | IMAGE SIZE | SHARPNESS | VIEWING ANGLE | QUALITY SCORE |
|---|---|---|---|---|
| input 1A | 600 x 800 | 7 | 5° | 8 |
| input 2B | 240 x 360 | 7 | 0° | 6 |

BIOMETRIC MATCHING ENGINE

The present application is related to co-pending U.S. patent applications entitled BIOMETRIC TRAINING AND MATCHING ENGINE having Ser. No. 13/644,090, and to BIOMETRIC MATCHING SYSTEM having Ser. No. 13/644,117, both of which are filed on even date herewith.

FIELD

The present disclosure relates to identifying a record in a biometric database based on one or more input biometric samples.

BACKGROUND

The use of biometric data for the identification of individuals is increasingly becoming the preferred choice in many environments due to the relative difficulty in fraudulently replicating the data. For example, due to increasing fraud involving payment cards such as credit cards, it has been proposed to use biometric data, such as for example fingerprints, to identify customers in shops or supermarkets to allow a payment transaction to be initiated. As a further example, biometric data is increasing used for identifying individuals authorized to enter restricted areas, such as gyms, border controls or vehicles. Furthermore, criminal databases have long been used for identifying individuals based on biometric data, such as a fingerprint or facial image taken at a crime scene.

To identify individuals, a biometric sample is obtained and compared to the records of a database, until a match is found. In the majority of applications, speed is of the essence. For example, if a user is at the checkout of a supermarket, or at a border control, an identification delay of more than several seconds may be considered unacceptable. A further requirement is that there are very few errors, i.e. very few false positive and false negative results. Indeed, if a customer at the checkout of a supermarket can not be identified, or is wrongly identified, this could lead to the customer being unable to make the payment, or to the wrong person being billed.

However, there is a technical problem in increasing the speed of identification and/or in reducing the error rate in current biometric identification systems.

SUMMARY

It is an aim of embodiments of the present disclosure to at least partially address one or more problems in the prior art.

According to one aspect, there is provided a method of identifying a biometric record of an individual in a database, the database comprising at least first and second sets of records, each set comprising at least one record, the method comprising: receiving by a processing device at least first and second input biometric samples of said individual; performing on the records of said first set a first matching process comprising a first filtering operation followed by a second filtering operation, and performing on the records of said second set a second matching process comprising said second filtering operation followed by said first filtering operation, wherein said first filtering operation comprises comparing said first input biometric sample to a first reference biometric sample of each record, and said second filtering operation comprises comparing said second input biometric sample to a second reference biometric sample of each record; and identifying a biometric record of said individual based on results of the first and second matching processes.

According to one embodiment, said first input biometric sample and said first reference biometric sample of each record are of a first type and said second input biometric sample and said second reference biometric sample of each record are of a second type different to said first type.

According to another embodiment, said first type and said second type are each either: a photo of the face of the individual; or a fingerprint of the individual; or an iris scan of the individual; or an image of a signature of the individual; or a finger vein or palm vein image of the individual; or a voice sample of the individual.

According to another embodiment, said first and second filtering operations each comprise eliminating one or more records based on the corresponding comparison.

According to another embodiment, the method further comprises, prior to performing said first and second matching processes, partitioning said database into a first partition comprising said first set of records and a second partition comprising said second set of records by comparing a parameter relating to at least one reference biometric sample of each record of said database with at least one threshold.

According to another embodiment, said partitioning is further based on a parameter relating to either or both of said first and second input biometric samples.

According to another embodiment, said parameter is a quality measurement of said reference biometric sample of each record of said database.

According to another embodiment, said partitioning is based on a quality measurement of at least one of the first and second input biometric samples and on a quality measurement of a reference biometric sample of each record.

According to another embodiment, the method further comprises determining said quality measurement based on either: the age of the individual of the biometric sample; or the gender of the individual of the biometric sample; or the size of an image of the biometric sample; the sharpness of an image of the biometric sample; or the viewing angle of an image of the biometric sample; or the contrast in an image of the biometric sample; or any combination of the above.

According to another embodiment, said first matching process comprises at least one filtering threshold determined based on metadata extracted from at least one record of said first set, and said second matching process comprises at least one filtering threshold determined based on metadata extracted from at least one record of said second set.

According to a further aspect, there is provided a computer readable medium storing a computer program that, when executed by a processor, causes the above method to be implemented.

According to a further aspect, there is provided a biometric matching device comprising: a database comprising first and second sets of records, each set comprising at least one record; and a processor configured to: perform on the records of said first set a first matching process comprising a first filtering operation followed by a second filtering operation, and perform on the records of said second set a second matching process comprising said second filtering operation followed by said first filtering operation, wherein said first filtering operation comprises comparing said first input biometric sample to a first reference biometric sample of each record, and said second filtering operation comprises comparing said second input biometric sample to a second reference biometric sample of each record; and identify a biometric record of said individual based on results of the first and second matching processes.

According to one embodiment, said processing device is further configured to partition said database into a first partition comprising said first set of records and a second partition comprising said second set of records by comparing a parameter relating to at least one reference biometric sample of each record of said database with at least one threshold.

According to a further aspect, there is provided a biometric matching system comprising: one or more biometric capturing devices for capturing at least one input biometric sample of an individual; and the above biometric matching device.

According to a further aspect, there is provided a method of identifying a biometric record of an individual in a database of biometric records, the method comprising: in response to the reception by a processing device of an input biometric sample of said individual, partitioning said database by said processing device into at least first and second partitions each comprising at least one of said biometric records, said partitioning comprising comparing a parameter relating to at least one reference biometric sample of each record of said database with at least one threshold value; evaluating by said processing device according to a first matching process whether the input biometric sample matches a reference biometric sample from each record of said first partition; evaluating by said processing device according to a second matching process whether the input biometric sample matches a reference biometric sample from each record of said second partition; and identifying the biometric record of said individual based on results of the first and second matching processes.

The details of various embodiments are set forth in the accompanying drawings and the description below. Other potential features will become apparent from the description, the drawings and the claims.

BRIEF DESCRIPTION OF THE DRAWINGS

The foregoing and other purposes, features and aspects of the disclosure will become apparent from the following detailed description of example embodiments, given by way of illustration and not limitation with reference to the accompanying drawings, in which:

FIG. 1 schematically illustrates a biometric identification system according to an example embodiment;

FIG. 2 schematically illustrates an electronic device according to an example embodiment;

FIG. 3 illustrates a portion of a biometric database according to an example embodiment;

Throughout the figures, like features have been labelled with like reference numerals.

DETAILED DESCRIPTION

Figure 4:
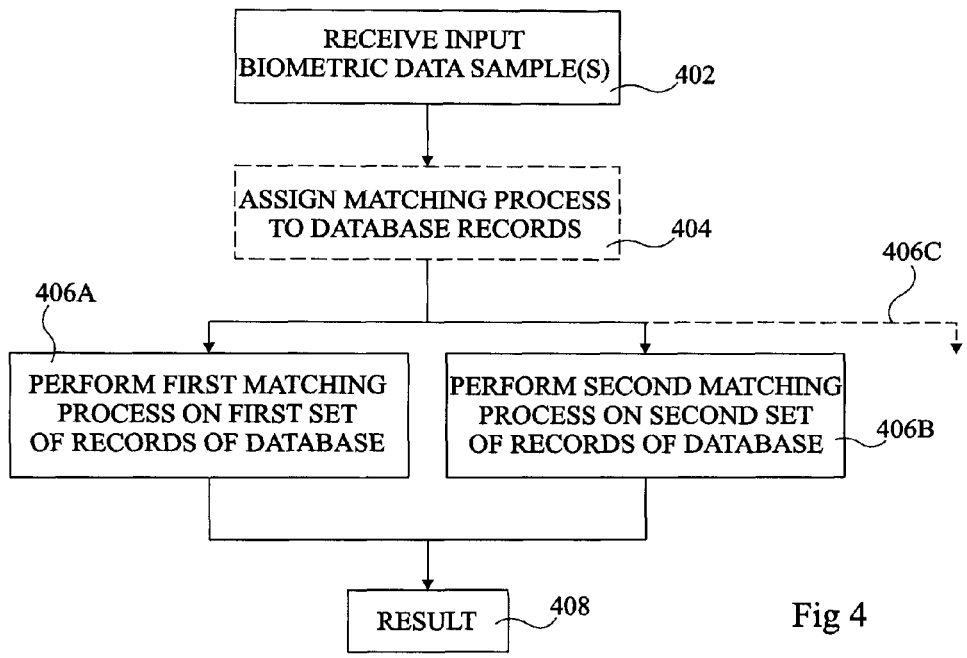
FIG. 4 is a flow diagram showing operations in a method of identifying a biometric record according to an example embodiment.

FIG. 1 illustrates a biometric identification system 100 according to an example embodiment.

System 100 comprises a matching engine 102, which receives a biometric input sample $S_{Bin}$ from a capturing device (D1) 104. The matching engine 102 may also receive a further biometric input sample $S'_{Bin}$ from a further capturing device (D2) 106. The capturing device 104 is for example a visible light or infra-red camera, a fingerprint sensor, microphone or other detector suitable for capturing a biometric sample of an individual. Input biometric sample $S_{Bin}$ could for example be a photo of the face, a fingerprint, an iris scan, an image of a signature, a finger vein or palm vein image, a voice sample, or any other form of biometric data of an individual. Input biometric sample $S'_{Bin}$ is for example also one of this list, but a different one to the sample $S_{Bin}$, such that two types of biometric samples can be used to evaluate a match. Additional capturing devices (not illustrated in FIG. 1) may be provided for capturing further biometric samples of the individual.

In some cases the individual is present at the detector 104 and/or 106 and submits the biometric input sample, for example by presenting their face to a camera or placing a finger on a fingerprint detector. In other cases, the biometric data may be retrieved from another source, such as from the scene of a crime in the case of a latent fingerprint, or from a surveillance video image.

The matching engine 102 receives the one or more biometric input samples from detector 104 and/or 106. In particular, the samples $S_{Bin}$ and $S'_{Bin}$ may be digital values transmitted to matching engine 102 via a data connection. The matching engine 102 could be located next to the detectors 104, 106, in which case the data connection could be a USB (universal serial bus) connection, Bluetooth connection, or similar wired connection. Alternatively, the matching engine 102 could be located remotely from the detectors 104, 106, and the data connection could be formed of a wired and/or wireless connection comprising a local area network (LAN), a metropolitan data network (MAN), wide area network (WAN), and/or the internet.

The matching engine 102 has access to a database (DB) 108 storing biometric records each associated with one or more reference biometric samples. The matching engine 102 searches the database for a record having a reference biometric sample matching the input biometric sample or samples. A result (R) is provided on an output 110 of the matching engine 102, and for example simply indicates whether or not a match was found. In alternative embodiments, the result R could contain data associated with the matching record, such as a reference number of the matching record, the identity, such as name, of the individual associated with the matching record, or other data.

The matching engine 102 is for example used for identifying a customer at supermarket checkout or a passport holder at a border control, performing criminal suspect identification, or for performing secure premises access control, such as at the entry to a gym or airport lounge.

FIG. 2 illustrates an apparatus 200 that is suitable for implementing the matching engine 102 of FIG. 1.

Apparatus 200 for example comprises a processing device 202, which is in communication with an instruction memory 204, a memory device 206 having a portion 208 for storing biometric samples, and in some embodiments a communications interface 210, a display 212 and one or more input devices 214. The processing device 202 is also in communication with the database 108 of FIG. 1 that stores the records containing reference biometric samples. The processing device 202 may comprises a microprocessor, microcontroller, digital signal processor, or appropriate combinations thereof, and executes instructions stored in the instruction memory 204, which could be a volatile memory such as DRAM (dynamic random access memory), or another type of memory. In some embodiments, the processing device 202 may comprise a plurality of processors that operate in parallel.

The memory device 206 is for example a non-volatile memory, such as a hard disk drive or FLASH drive. The communications interface 210 for example provides a connection to the capturing devices 104, 106, and may be a USB interface, or network interface, for example providing a wired or wireless connection to a communications network such as the internet. The display 212, as well as one or more input devices such as a keyboard or mouse, may be provided for allowing an administrator to control the operation of the matching engine 102, to download software updates, etc.

FIG. 3 illustrates a portion of the database 108 of FIG. 1, storing biometric records according to an example embodiment, each record corresponding to a different individual and containing a number of reference biometric samples of the record holder of. The record holders of the records stored in the database will depend on the particular application, but could correspond to members of a gym, employees of an office, or convicted criminals.

In FIG. 3, three biometric records are shown as an example, having references "0001", "0002" and "0003" respectively indicated in a field 302. Of course in practise the database is likely to contain hundreds or thousands of records. Each biometric record is associated with a corresponding record holder, but for security reasons, the database 108 for example only identifies these individuals by a reference number. A separate table, for example stored by the matching engine 102, may indicate the mapping between the reference numbers of field 302 and personal details of the corresponding record holder, such as name, address, account details etc., depending on the application.

A field 304 for example comprises a digital image of the face of the record holder, a field 306 for example comprises a digital image of the fingerprint of the record holder, a field 308 for example comprises a digital image of an iris scan of the record holder, and a field 310 for example comprises a digital image of the signature of the record holder. Of course, in alternative examples of the biometric database, only some of these fields may be present and/or addition fields comprising other biometric data could be included.

In the example of FIG. 3, not all records comprise a sample in each field 304 to 310. For example, some of the record holders may not have provided some of the reference samples. In particular, only records 0001 and 0002 comprise images of the face of the record holder in field 304, labelled "image1A" and "image 2A" respectively. Furthermore, only records 0002 and 0003 comprise fingerprint images in field 306, labelled "image2B" and "image3B" respectively, and only records 0001 and 0003 comprise iris scan images in field 308, labelled "image1C" and "image3C" respectively. All three records comprise signature images in field 310, labelled "image1D", "image2D" and "image3D" respectively.

The one or more input biometric samples to be compared with the reference biometric samples of the database 108 comprise at least a digital representation of the biometric data corresponding to one or more of the fields contained in the matching record of the database. Indeed, an input photo of the face of the individual could not be used to identify the record 0003 given that this record does not contain a corresponding reference image.

FIG. 4 is a flow diagram showing operations in a method of matching biometric data samples according to an example embodiment. These operations are, for example, implemented by the matching engine 102 of FIG. 1.

In a first operation 402, at least one input biometric sample is received by the matching engine, for example from the capturing device 104 and/or 106 of FIG. 1. For example, these samples are stored in the memory portion 208 of FIG. 2.

In a subsequent operation 404, one of at least two different matching processes is assigned to each record of the database. Each matching process for example defines the particular routines that are used to compare the biometric samples, the order in which the types of biometric samples are processed and/or the thresholds used to keep or eliminate match candidates. As will be described in more detail below, the database comprises a plurality of sets of records. For example, based on pre-defined rules, each record of the database is assigned a particular matching process, those records that are assigned the first matching process forming the first set of records, and those records that are assigned the second matching process forming the second set of records. Alternatively, the database is partitioned into sets that group together records having similar properties, as will be explained in more detail below, and a matching process is assigned to each partition. All the records in a partition are assigned the same matching process, which is different for each partition. Some more detailed examples of the various rules that may be used for assigning matching processes to each record and/or for partitioning the database are provided below.

In subsequent operations 406A and 406B, the matching processes are executed on the records of each set of records. In particular, a first matching process is performed on the first set of records of the database in operation 406A, and a second matching process is performed on a second set of records of the database, as shown in operation 406B. One or more further matching processes may also be performed on further database partitions, as indicated by dashed arrow 406C. The operations 406A, 406B and the one or more further operations 406C may be performed in parallel as represented in FIG. 4, in which case the matching engine 102 of FIG. 1 for example comprises multiple processors, one for implementing each matching process. Alternatively, these operations may be performed in series, or in any order. One of skill in the art will appreciate that while only two database partitions are discussed with respect to FIG. 4, any number of database partitions may exist to store corresponding records without departing from the scope of this disclosure.

After operations 406A, 406B and optionally 406C, the results of these matching processes are provided in an operation 408, indicating whether or not a matching record was found. In particular, one or more matching operations applied during each matching process will result in corresponding similarity scores indicating the similarity between the input biometric sample and the reference biometric sample of each record. These scores are for example used to determine whether or not each record is a match. Generally either no matching record or a single matching record will be found for each request based on one or more input biometric samples. If more than one matching record is identified, this may indicate duplication in the database or an error, and thus such an event is for example signalled to a moderator.

Figure 5:
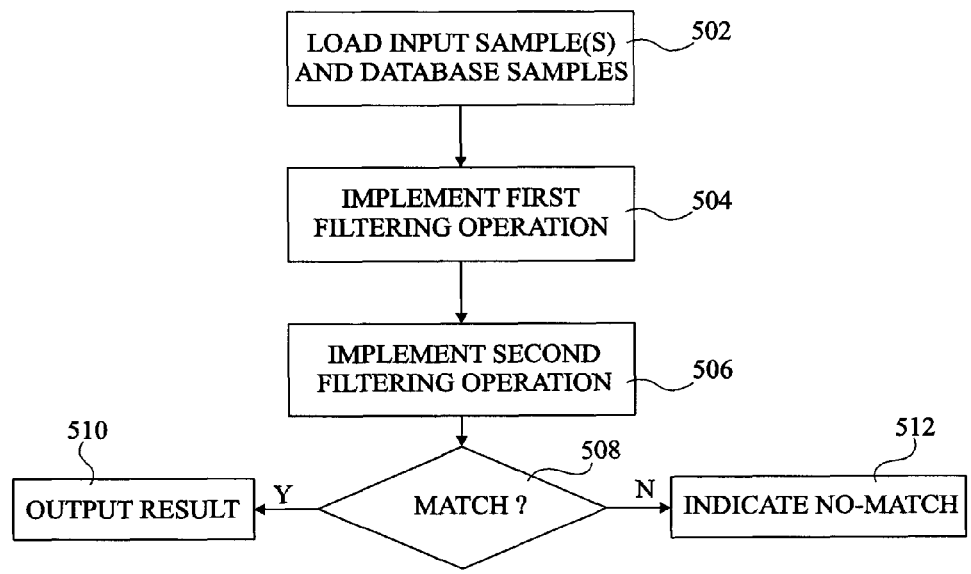
FIG. 5 is a flow diagram showing operations in a method of a biometric matching process according to an example embodiment.

FIG. 5 is a flow diagram showing examples of operations in a biometric matching process applied in operation 406A or 406B of FIG. 4, which is for example performed by the matching engine 102 of FIG. 1.

In an operation 502, the matching engine 102 loads one or more input biometric samples and some or all of the reference biometric data samples of a corresponding partition ready for comparison. For example, the samples are loaded into a memory of the matching engine 102.

In a subsequent operation 504, a first filtering operation is used to filter the records of the corresponding set of records based on a comparison of the input biometric sample with a corresponding sample of each record, to filter out at least some of the records. The first filtering operation is for example chosen to filter out around 50 percent of the records very quickly and with relatively few false negatives. The filter is for example associated with a threshold that determines the records to be filtered in or filtered out, based on a similarity score determined for the record. A permissive threshold, for example relatively low, can be chosen such that a relatively high number of records are filtered in. A restrictive threshold, for example relatively high, can be chosen such that a relatively high number of records are filtered out. Generally, the threshold is chosen such that, while there may be a high likelihood that a non-matching record is filtered in, there is a very low risk that the matching record is erroneously filtered out during this operation. As an example, assuming that during the first filtering operation a similarity score of the input biometric sample with each record is provided on a scale of 1 to 100, it may be determined that any record scoring less than 50 can be filtered out as it is very unlikely that such a low-scoring record corresponds to a match. Of course, it may be quite likely that a lot of non-matching records score over such a threshold, but the aim of the first filter is for example to reduce the number or records as much as possible.

In a subsequent operation 506, a second filtering operation is used to analyse the remaining records to identify, if present, the record with a matching biometric sample. The comparison performed in this operation may or may not be based on the same input biometric sample as used in the first filtering operation 504. The second filtering operation is for example chosen to have very low false negative and false positive results, and is thus for example slower to execute per record than the first filtering operation. For example, this second filtering operation returns just one or a few of the best matching records. In one example, a similarity score determined in the second filtering operation is provided on a scale of 1 to 100, and a match is only considered if the record reaches a score of at least 90, which is for example known to be very rare in the case of a non-matching record.

In a subsequent operation 508, it is determined whether or not a matching record has been identified. For example, in some embodiments, the second filtering operation 506 only indicates a match if there is relatively high certainty. In alternative embodiments, the second filtering operation 506 always outputs the best matching record, and also indicates the level of certainty that the record is a match, i.e. that the input biometric data sample came from the record holder. In such an embodiment, operation 508 may involve comparing the level of certainty with a threshold in order to judge whether there is a match. For example, a match is considered to have occurred if there is at least 99 percent certainty. Alternatively, the certainty level of the matching record from each database partition could be used to select the best matching record.

After operation 508, if a match was found from the partition being processed, the next operation is 510, in which this result of this matching process is provided. This result is for example compared to the results of the other matching processes applied to the other partitions in order to generate the result R at the output of the matching engine. Alternatively, if no matching record is found, the next operation is 512, in which a no-match is indicated.

The flow diagram of FIG. 5 provides just one example of a type of matching process that could be applied in order to find a record in the database 108 having one or more reference biometric samples matching one or more input biometric samples. There are various features of this process that can be modified to provide alternative matching processes, such as the particular filtering operations 504 and 506, the thresholds applied in the operation 504, and the type of biometric data sample compared in operations 504, 506, which could be the same or different. Furthermore, rather than the two-phase approach involving the first and second filtering operations, alternative matching processes could involve applying only the second filtering operation, or an additional filtering operations after the second filtering operation, the final filtering operation for example reducing the number of records to just one, or indicating the best matches.

The particular techniques used to compare the biometric samples and detect a match will be known to those skilled in the art, and are for example based on cascaded tests. For example, fingerprint and face recognition is discussed in the publication "Intelligent Biometric Techniques in Fingerprint and Face Recognition", Jain, L. C. et al. and "Partially Parallel Architecture for AdaBoost-Based Detection With Haar-like Features", Hiromote et al., the contents of which are hereby incorporated by reference to the extent allowable by the law.

Figures 6, 7A, 7B:
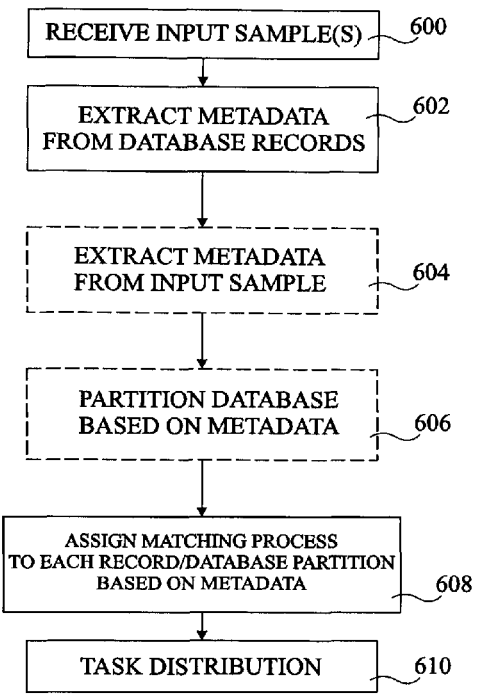
FIG. 6 is a flow diagram showing operations for assigning matching processes to records of a database according to an example embodiment.
FIGS. 7A and 7B illustrate examples of extracted metadata according to an example embodiment.

FIG. 6 is a flow diagram illustrating operations for assigning a matching process to each record of the database according to an example embodiment.

In a first operation 600, one or more input samples is received.

In an operation 602, metadata corresponding to the reference biometric samples is extracted from each database record. For example, the metadata comprises a quality measurement of the sample, as will be described in more detail below.

In a subsequent operation 604, metadata is optionally extracted from the input biometric sample or samples. The extracted metadata is for example of the same type as the data extracted from the database records in operation 602.

In a subsequent operation 606, the database is optionally partitioned based on the metadata, by classifying each record of the database into one of a number of partitions. In particular, each time one or more new input biometric samples is received, this for example triggers a new partitioning of the database. In other words, for each search operation, the partitions, and in particular the records that each partition contains, are dynamically re-defined. In some embodiments, the database is partitioned only based on metadata extracted from the database records, in which case the database partitioning may be performed before the input biometric sample is received. Alternatively, the database is partitioned based on a combination of the metadata extracted from the database records and from the metadata extracted from the one or more input biometric samples. The number of database partitions is for example defined by rules set by a system operator, and will depend on factors such as the types of biometric samples and the available matching processes. The number of partitions is for example at least two. There could be several hundreds or even thousands of partitions, there being no upper limit. In some cases the number of partitions may be determined automatically by the matching engine. Partitioning the database is explained in more detail below with reference to FIGS. 7A and 7B.

In a subsequent operation 608, a matching process is assigned to each database partition, or to each record if the database has not been partitioned, based on the metadata. The matching processes are for example assigned based on rules set by the system operator, as will be described in more detail below. In some cases, each record could be assigned a personalized matching process based on the extracted metadata. For example, the filter threshold of each matching process could be calculated based on the extracted metadata.

A subsequent operation 610 involves distributing tasks. For example, in the case that the matching processes for each database partition/record are to be performed in parallel, this involves instructing the corresponding processors accordingly. Alternatively, if the matching processes are to be performed at least partially in series, task distribution for example involves determining the order that the matching processes are to be executed.

FIGS. 7A and 7B respectively illustrate examples of metadata extracted from database records and from biometric input samples.

With reference first to FIG. 7A, a table 700 shows in rows some examples of metadata that may be extracted from a few of the biometric reference samples of database 300. For example, for the photo of face "image1A" of record "0001", the metadata for example comprises the age and gender of the record holder, in this example having the respective values 66 and male. This information is for example obtained from the record holder.

Furthermore, data relating to the image may be extracted.

For example the image size may be extracted as the number of pixels in the rectangular image, which in the example of "image1A" is for example 1200 by 1600 pixels.

A sharpness level may be evaluated on a scale of 1 to 10 using techniques known to those skilled in the art, which in the example of "image1A" is equal to 8.

A viewing angle may be determined, a zero angle for example indicating that the face is head-on to the camera, a positive angle indicating a face turned to the right, and a negative angle indicating a face turned to the left. In the example of "image1A", the angle is for example 5 degrees.

A contrast level, for example on a scale of 1 to 20, may also be evaluated by techniques that will be known to those skilled in the art. In the example of "image1A", the value is 11.

It will be apparent to those skilled in the art that only some of these values, and/or additional values, could be extracted from the database samples. Furthermore, metadata indicating the particular types of biometric reference samples present in each record is for example extracted.

The records of the database are partitioned based on the extracted metadata. A few examples of such partitioning operations will now be provided.

In one example, the records are classified into partitions and/or assigned a matching process based on the particular reference biometric samples that they contain. For example, all records containing an image of a face are placed in a first partition and/or assigned a first matching process, and all those without are placed in a second partition and/or assigned a second matching process.

Additionally or alternatively, the database is for example partitioned and/or matching processes are assigned to each record based on the quality of the samples, which indicates the facility by which matching may be performed on the data. For example, it may be considered that biometric samples from record holders over 60 are of poorer quality and thus harder to analyse than samples from those under 60. In this case, all records for which the age of the record holder is over this threshold are placed in a one partition and/or assigned a first matching process, and all those under this threshold are placed in another partition and/or assigned another matching process.

Additionally or alternatively, one or more properties of the image, such as image size, sharpness, viewing angle or contrast can be used as quality indicators, and used to partition the database and/or assign matching processes to each record. For example, all records having a sharpness of greater than 7 are placed in one partition and/or assigned a first matching process, and all those with a sharpness of less than 7 are placed in another partition and/or assigned another matching process.

Alternatively, a quality score may be determined for each record, for example on a scale of 0 to 10, indicating an overall quality rating of the biometric sample based on the various parameters available. An example of this score is shown in the right-hand column of table 700. This quality score may then be used to partition the database and/or assign a matching process to each record, for example into good quality samples having scores between 6 and 10, and low quality samples having scores between 0 and 5.

In one particular example, each record of the database is classified into one of four partitions as follows, based on the presence of an iris scan and of a fingerprint, and on the quality of the fingerprint:

partition 1: Iris scan+no fingerprint
partition 2: Iris scan+good quality fingerprint
partition 3: Iris scan+low quality fingerprint
partition 4: All remaining records (no iris scan)

Once the database is partitioned, a matching process is for example assigned to each partition using predefined rules, based on the biometric reference samples. For example, the matching processes for the four partitions above are based on the following samples used during the first and second filtering operations of FIG. 5, and in some cases during subsequent third and fourth filtering operations. It is assumed that all records having good quality face images.

partition 1: 1st filter: iris; 2nd filter: face
partition 2: 1st filter: fingerprint with restrictive threshold; 2nd filter: fingerprint; 3rd filter: iris; 4th filter: face.
partition 3: 1st filter: fingerprint with permissive threshold; 2nd filter: Iris; 3rd filter: fingerprints; 4th filter: face.
partition 4: 1st filter: fingerprint; 2nd filter: face.

With reference to FIG. 7B, a table 750 shows an example of metadata that could be extracted from two input biometric samples "input1A" and "input1B", which are for example a face image and a fingerprint respectively. In this example, the extracted metadata is for example the image size, the image sharpness, the viewing angle and an overall quality score, which are determined using the same criteria as described above in relation to FIG. 7A. Some or all of this metadata may be used to partition the database, in addition to the metadata associated with each record.

For example, it may be determined that if the input biometric sample and a reference biometric sample are a face image having a similar viewing angle, a fast filtering operation can be applied to the images with a restrictive threshold, whereas if the viewing angles are different, a slower filtering operation should be used, with a more permissive threshold. Thus the records may be partitioned based on the difference between the viewing angles of the face image.

Alternatively or additionally, the records could be classified into partitions and/or assigned a matching process based on a combination of the quality scores, for example by performing a multiplication of the quality score of the input biometric sample with the quality score of the corresponding records.

As another example, the following four partitions could be used:
Partition 1: $\Delta\theta<10°$; $Q_i.Q_r>50$
Partition 2: $\Delta\theta>10°$; $Q_i.Q_r>50$
Partition 3: $\Delta\theta<10°$; $Q_i.Q_r<50$
Partition 4: $\Delta\theta>10°$; $Q_i.Q_r<50$
where $\Delta\theta$ is the difference between the viewing angles of the input biometric samples and the reference biometric samples, $Q_i$ is the quality score of the input biometric reference, and $Q_r$ is the quality scores of the reference biometric samples.

The matching process assigned to each of these four partitions may use a first filtering operation having a filtering threshold adapted accordingly. For example, partition 1 may have a restrictive threshold, partitions 2 and 3 average thresholds, and partition 4 a permissive threshold.

Figure 8:
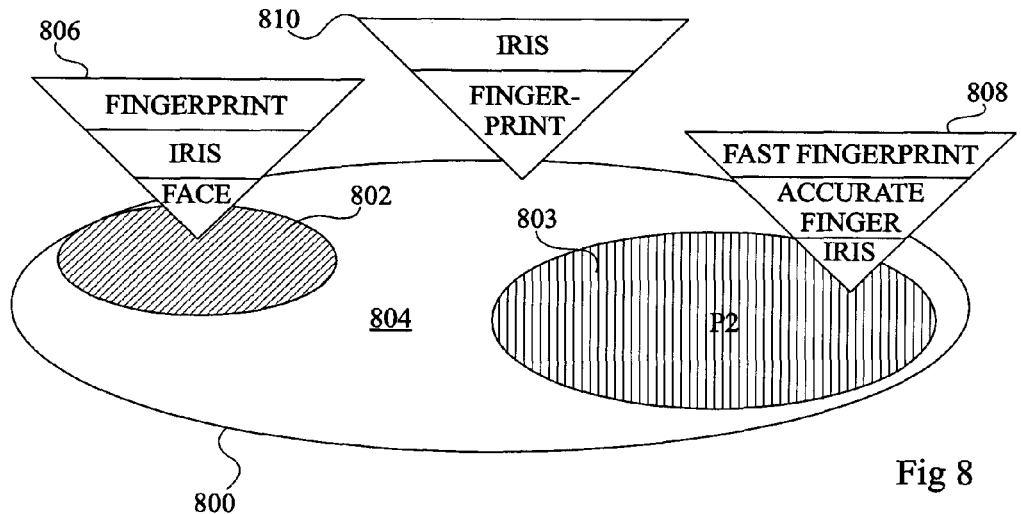
FIG. 8 is a diagram schematically representing an example of three matching processes applied to partitions of a biometric database.

FIG. 8 is a diagram very schematically representing an example of three matching processes applied to partitions of a biometric database. A region bounded by an oval 800 represents all of the biometric records of the database, while a partition P1 is represented by an oval 802 with diagonal shading inside oval 800, and a partition P2 is represented by an oval 803 with vertical shading inside oval 800. The remaining region inside oval 800 is labelled 804, and represents all the records not falling within partitions P1 and P2, which thus form a default partition.

Matching processes 806, 808 and 810 are respectively assigned to partitions P1 and P2, and to the default partition 804, and are represented by triangles in FIG. 8. It is assumed that three input biometric samples are received, in the form of a fingerprint, an iris scan, and a face image. Matching process 806 for example applies three filtering operations, starting with a fingerprint filter, followed by an iris filter, and then finishing with a face filter. Each filter allows certain records to be eliminated. The matching process 808 for example applies three filtering operations, starting with a fast fingerprint filter, followed by an accurate and thus slower fingerprint filter, and then finishing with an iris filter. The matching process 810 for example applies two filtering operations, starting with a iris filter and followed by a fingerprint filter.

Thus, in the example of FIG. 8, depending on the partition in which a record falls, the order in which the biometric data types are processed will vary. For example, a record will be either processed by a fingerprint filter followed by an iris filter if it falls within partition P1, or vice versa if it falls within the default partition 804. For example, the records of partition P1 have relatively high quality fingerprint images that are quick to process, whereas the records of the default partition 804 have relatively low quality fingerprints that are slow to process, and thus by changing the filtering order based on the fingerprint quality, the overall processing time can be reduced.

Figure 9:
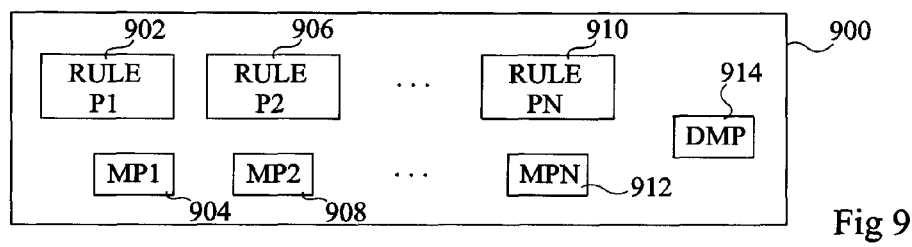
FIG. 9 illustrates an example of a memory.

FIG. 9 illustrates an example of a memory 900, for example forming part of the memory device 206 of FIG. 2, storing rules for forming database partitions, and definitions of corresponding matching processes. In particular, a memory location 902 stores the rule corresponding to partition P1, and an associated location 904 stores the matching process MP1 associated with partition P1. Similarly, a memory location 906 stores the rule corresponding to partition P2, and an associated location 908 stores the matching process MP2 associated with partition P2. Depending on the number of partitions, further rules may be defined, and assuming a total of N partitions, memory locations 910, 912 store the rule and matching process MPN respectively for a partition PN. A memory location 914 for example stores the default matching process DMP to be applied to all records not falling into one of the other partitions.

For example, each of the rules defining the partitions P1 to PN defines a distinct subset of the records of the database. Alternatively, to generate the partitions, rules may be applied in a certain order, starting with the most restrictive. For example, assuming that a quality level is used to partition the database, a partition P1 may be generated first to comprise all records with a quality over 8, then a partition P2 may be generated to comprise any of the remaining records having a quality over 6, then a partition P3 may be generated to comprise any of the remaining records having a quality over 4, and any remaining records for example fall in the default partition.

The definition of the partitioning rules in memory 900 has the feature of allowing new records to be added to the biometric database without the need of recreating the partitions at that time. Indeed, the partitioning of the new records will occur dynamically, at the time of a subsequent matching task, based on the existing rules.

Furthermore, the partitioning rules may be adapted dynamically and rapidly, for example in response to new records entered into the database. Indeed, this involves only the adjustment of an existing rule in memory 900, and/or the addition of a new rule within memory 900, to define a new partition. For example, a new set of biometric records added to the database may have particularly high fingerprint qualities, allowing a certain matching strategy to be applied to these records. A new rule could be used to group these records in a new partition based on a relatively high threshold for fingerprint quality.

Figure 10:
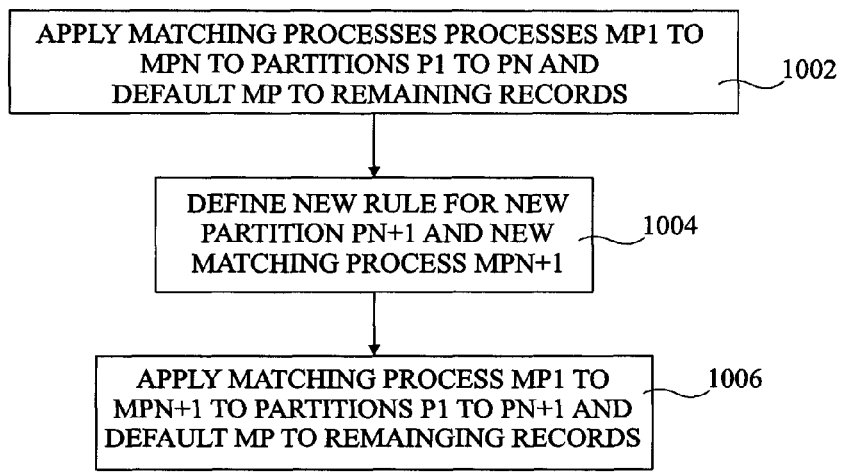
FIG. 10 is a flow diagram illustrating a sequence of operations involving the addition of a new database partition.

FIG. 10 is a flow diagram illustrating a sequence of operations performed for example using processing device 202 of FIG. 2, and involving the addition of a new database partition.

In an operation 1002, a matching task is performed in response to the reception of one or more input biometric samples, involving creating partitions P1 to PN based on corresponding rules, and then applying matching processes MP1 to MPN to the partitions P1 to PN, and a default matching process to the remaining records of the database.

In a subsequent operation 1004, a new partition PN+1 is defined, for example, in order to improve performance, by adding a new rule and corresponding matching process MPN+1 in the memory 900 described above.

Then, in a subsequent matching task 1006, in response to the reception of one or more new biometric input samples, the partitions P1 to PN+1 are created based on the corresponding rules, and the matching processes MP1 to MPN are applied to partitions P1 to PN as before, and additionally the matching process MPN+1 is applied to the new partition PN+1. The default matching process is also applied to the remaining records.

Thus, the matching processes applied to certain records of the database may be dynamically altered between matching tasks in a simple fashion by simply defining a new rule and matching process in memory 900. The definition of an existing partition may be updated in a similar manner.

A feature of applying different matching processes to different sets of records of the biometric database is that the processes may be adapted to the samples of sets of records. In particular, the order that the types of biometric data are processed may be adapted such that a relatively large number of records are filtered out quickly, without a high number of false negative decisions. In this way, certain partitions may be processed quickly, and the choice of matching process is not constrained by the worst case records of the database.

A feature of partitioning the database in response to new input biometric samples being received is that the database partitions may be altered and new partitions added in a quick and simple fashion.

While a number of specific embodiments of devices and methods of the present disclosure have been provided above, it will be apparent to those skilled in the art that various modifications and alternatives could be applied.

For example, it will be apparent to those skilled in the art that the examples of matching processes applied to the records of the database partitions are merely a few such examples, and that other matching processes could be used.

Furthermore, it will be apparent to those skilled in the art that other criteria could be used to partition the database of biometric records.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method comprising:
receiving, by a processing device, a first input biometric sample associated with an individual and a second input biometric sample associated with the individual;
determining, by the processing device, one or more first characteristics associated with the first input biometric sample and one or more second characteristics associated with the second input biometric sample;
grouping, by the processing device and after receiving the first input biometric sample and the second input biometric sample, a plurality of records to form a first set of records and a second set of records,
wherein the grouping is based on the one or more first characteristics and the one or more second characteristics;
performing, by the processing device and on the first set of records, a first matching process based on at least one first filtering threshold,
the at least one first filtering threshold being determined based on metadata extracted from at least one record included in the first set of records, and
the first matching process comprising:
a first filtering operation followed by a second filtering operation, the first filtering operation including:
comparing the first input biometric sample to a first reference biometric sample associated with each record included in the first set of records, and the second filtering operation including:
comparing the second input biometric sample to a second reference biometric sample associated with each record included in the first set of records;
performing, by the processing device and on the second set of records, a second matching process based on at least one second filtering threshold,
the at least one second filtering threshold being determined based on metadata extracted from at least one record included in the second set of records, and
the second matching process comprising:
a third filtering operation followed by a fourth filtering operation,
the third filtering operation including:
comparing the first input biometric sample to a third reference biometric sample associated with each record included in the second set of records, and
the fourth filtering operation including:
comparing the second input biometric sample to a fourth reference biometric sample associated with each record included in the second set of records; and
identifying, by the processing device, a biometric record associated with the individual based on a result of the first matching process and a result of the second matching process.

2. The method of claim 1, where the first input biometric sample and the first reference biometric sample associated with each record, of the plurality of records, comprise a first type of biometric sample, and
where the second input biometric sample and the second reference biometric sample associated with each record, of the plurality of records, comprise a second type of biometric sample, where the second type of biometric sample is a different type of biometric sample than the first type of biometric sample.

3. The method of claim 2, where the first type of biometric sample includes one of:
an image of a face of the individual,
a fingerprint of the individual,
an iris scan of the individual,
an image of a signature of the individual,
a finger vein or palm vein image of the individual, or
a voice sample of the individual.

4. The method of claim 1, where performing the first matching process further comprises:
eliminating a first group of records, from the first set of records, based on a result of the first filtering operation, the first set of records including a remaining group of records after eliminating the first group of records; and
where performing the second matching process includes:
eliminating, from the remaining group of records, one or more of:
each record included in the remaining group of records, or all but one record included in the remaining group of records.

5. The method of claim 1, where the plurality of records are stored in a database; and
where grouping the plurality of records includes:
prior to performing the first matching process and the second matching process and subsequent to receiving the first biometric input sample and the second biometric input sample, partitioning the database into a first partition that includes the first set of records and a second partition that includes the second set of records by comparing a parameter relating to at least one reference biometric sample associated with each record, of the plurality of records, with at least one threshold.

6. The method of claim 5, where the parameter is a first parameter, and
where partitioning the database includes:
determining, based on the one or more first characteristics and the one or more second characteristics, a second parameter relating to at least one of the first input biometric sample and the second input biometric sample; and
partitioning the database into the first partition and the second partition further based on the second parameter.

7. The method of claim 5, where the parameter is a quality measurement associated with the at least one reference biometric sample associated with each record of the plurality of records.

8. The method of claim 7, further comprising:
determining the quality measurement based on one or more of:
an age of an individual associated with the at least one reference biometric sample associated with each record of the plurality of records,
a gender of the individual associated with the at least one reference biometric sample associated with each record of the plurality of records,
a size of an image of the at least one reference biometric sample associated with each record of the plurality of records,
a sharpness of the image of the at least one reference biometric sample associated with each record of the plurality of records,
a viewing angle of the image of the at least one reference biometric sample associated with each record of the plurality of records, or
a contrast in the image of the at least one reference biometric sample associated with each record of the plurality of records.

9. The method of claim 5, where partitioning the database includes:
partitioning the database into the first partition and the second partition based on a quality measurement of at least one of the first input biometric sample or the second input biometric sample and based on a quality measurement of the at least one reference biometric sample associated with each record of the plurality of records.

10. The method of claim 1, further comprising:
receiving a third input biometric sample and a fourth input biometric sample;
determining one or more third characteristics associated with the third input biometric sample and one or more fourth characteristics associated with the fourth input biometric sample;
grouping the plurality of records to form a third set of records and a fourth set of records based on the one or more third characteristics and the one or more fourth characteristics,
where the third set of records and the fourth set of records each include one or more of:
a record included in the first set of records, or
a record included in the second set of records.

11. A non-transitory computer-readable medium storing instructions, the instructions comprising:
one or more instructions that, when executed by a processor, cause the processor to:
receive a first input biometric sample and a second input biometric sample,
the first input biometric sample and the second input biometric sample being associated with an individual;
determine one or more first characteristics associated with the first input biometric sample and one or more second characteristics associated with the second input biometric sample;
group, after receiving the first input biometric sample, a plurality of records to form a first set of records and a second set of records,
wherein the plurality of records are grouped based on the one or more first characteristics and the one or more second characteristics;
perform, on the first set of records, a first matching process based on at least one first filtering threshold,
the at least one first filtering threshold being determined based on metadata extracted from at least one record included in the first set of records, and
the one or more instructions to perform the first matching process including:
one or more instructions that, when executed by the processor, cause the processor to perform a first filtering operation followed by a second filtering operation,
the one or more instructions to perform the first filtering operation including:
one or more instructions that, when executed by the processor, cause the processor to compare the first input biometric sample to a first reference biometric sample associated with each record included in the first set of records, and the one or more instructions to perform the second filtering operation including:
one or more instructions that, when executed by the processor, cause the processor to compare the second input biometric sample to a second reference biometric sample of each record included in the first set of records;
perform, on the second set of records, a second matching process based on at least one second filtering threshold,
the at least one second filtering threshold being determined based on metadata extracted from at least one record included in the second set of records, and
the one or more instructions to perform the second matching process including:
one or more instructions that, when executed by the processor, cause the processor to perform a third filtering operation followed by a fourth filtering operation,
the one or more instructions to perform the third filtering operation including:
one or more instructions that, when executed by the processor, cause the processor to compare the first input biometric sample to a third reference biometric sample associated with each record included in the second set of records, and
the one or more instructions to perform the fourth filtering operation including:
one or more instructions that, when executed by the processor, cause the processor to compare the second input biometric sample to a fourth reference biometric sample of each record included in the second set of records; and
identify a biometric record associated with the individual based on a result of the first matching process and a result of the second matching process.

12. The non-transitory computer-readable medium of claim 11, where the instructions further comprise:
one or more instructions that, when executed by the processor, cause the processor to:
receive a third input biometric sample and a fourth input biometric sample;
determine one or more third characteristics associated with the third input biometric sample and one or more fourth characteristics associated with the fourth input biometric sample;
group the plurality of records to form a third set of records and a fourth set of records based on the one or more third characteristics and the one or more fourth characteristics,
where the third set of records and the fourth set of records each include one or more of:
a record included in the first set of records, or
a record included in the second set of records.

13. The non-transitory computer-readable medium of claim 12, where the instructions further comprise:
one or more instructions that, when executed by the processor, cause the processor to:
perform a third matching process on the third set of records and a fourth matching process on the fourth set of records,
the fourth matching process being different from the first matching process, the second matching process, and the third matching process; and
identify another biometric record, of the plurality of biometric records, associated with another individual based on a result of performing the third matching process and the fourth matching process.

14. A biometric matching device comprising:
a processor to:
receive a first input biometric sample and a second input biometric sample;
determine one or more first characteristics associated with the first input biometric sample and one or more second characteristics associated with the second input biometric sample;
group, after receiving the first input biometric sample and the second input biometric sample, a plurality of records to form a first set of records and a second set of records,
wherein the plurality of records are grouped based on the one or more first characteristics and the one or more second characteristics;
perform, on records included in the first set of records, a first matching process based on at least one first filtering threshold,
the at least one first filtering threshold being determined based on metadata extracted from at least one record included in the first set of records, and
when performing the first matching process, the processor being to:
perform a first filtering operation followed by a second filtering operation,
when performing the first filtering operation, the processor being to:
compare the first input biometric sample to a first reference biometric sample of each record included in the first set of records, and
when performing the second filtering operation, the processor being to:
compare the second input biometric sample to a second reference biometric sample included in each record of the first set of records; and
perform, on records included in the second set of records, a second matching process based on at least one second filtering threshold,
the at least one second filtering threshold being determined based on metadata extracted from at least one record included in the second set of records, and
when performing the second matching process, the processor being to:
perform a third filtering operation followed by a fourth filtering operation,
when performing the third filtering operation, the processor being to:
compare the first input biometric sample to a third reference biometric sample associated with each record included in the second set of records, and
when performing the fourth filtering operation the processor being to:
compare the second input biometric sample to a fourth reference biometric sample associated with each record included in the second set of records; and
identify a biometric record, of the plurality of biometric records, associated with an individual based on a result of the first matching processing and a result of the second matching process.

15. The biometric matching device of claim 14, where the plurality of records are stored in a database associated with the biometric matching device; and where, when grouping the plurality of records to form the first set of records and the second set of records, the processor is to:
    partition the database into a first partition comprising the first set of records and a second partition comprising the second set of records by comparing a parameter, relating to at least one reference biometric sample associated with each record, of the plurality of records, with at least one threshold.

16. The biometric matching device of claim 14, where the processor is further to:
    receive a third input biometric sample and a fourth input biometric sample;
    determine one or more third characteristics associated with the third input biometric sample and one or more fourth characteristics associated with the fourth input biometric sample; and
    group the plurality of records to form a third set of records and a fourth set of records based on the one or more third characteristics and the one or more fourth characteristics,
        the third set of records and the fourth set of records each including one or more of:
            a record included in the first set of records, or
            a record included in the second set of records.

17. A biometric matching system comprising:
a biometric matching device including:
    a processor to:
        receive a first input biometric sample of an individual and a second input biometric sample of the individual;
        determine one or more first characteristics associated with the first input biometric sample and one or more second characteristics associated with the second input biometric sample;
        group, after receiving the first input biometric sample and the second input biometric sample, a plurality of records to form a first set of records and a second set of records,
            wherein the plurality of records are grouped based on the one or more first characteristics and the one or more second characteristics;
        perform, on the first set of records, a first matching process based on at least one first filtering threshold,
            the at least one first filtering threshold being determined based on metadata extracted from at least one record included in the first set of records, and
            when performing the first matching process the processor being to:
                perform a first filtering operation followed by a second filtering operation,
                when performing the first filtering operation, the processor being to:
                    compare the first input biometric sample to a first reference biometric sample associated with each record included in the first set of records, and
                when performing the second filtering operation, the processor being to:
                    compare the first input biometric sample to a second reference biometric sample associated with each record included in the first set of records;
        perform, on the second set of records, a second matching process based on at least one second filtering threshold,
            the at least one second filtering threshold being determined based on metadata extracted from at least one record included in the second set of records, and
            when performing the second matching process, the processor being to:
                perform a third filtering operation followed by a fourth filtering operation,
                when performing the third filtering operation, the processor being to:
                    compare the second input biometric sample to a third reference biometric sample associated with each record included in the second set of records, and
                when performing the fourth filtering operation, the processor being to:
                    compare the second input biometric sample to a fourth reference biometric sample of each record included in the second set of records; and
        identify a biometric record, of the plurality of biometric records, associated with the individual based on a result of the first matching process and a result of the second matching process.

18. The biometric matching system of claim 17, where the biometric matching device is further to:
    receive a third input biometric sample and a fourth input biometric sample;
    determine one or more third characteristics associated with the third input biometric sample and one or more fourth characteristics associated with the fourth input biometric sample; and
    group the plurality of records to form a third set of records and a fourth set of records based on the one or more third characteristics and the one or more fourth characteristics,
        where the third set of records and the fourth set of records each include one or more of:
            a record included in the first set of records, or
            a record included in the second set of records.

19. The biometric matching system of claim 18, where the biometric matching device is further to:
    perform a third matching process on the third set of records and a fourth matching process on the fourth set of records,
        the fourth matching process being different from the first matching process, the second matching process, and the third matching process; and
    identify another biometric record, of the plurality of biometric records, associated with another individual based on a result of performing the third matching process and the fourth matching process.

20. A method comprising:
    after receiving a first input biometric sample associated with an individual and a second input biometric sample associated with the individual, partitioning, by a processing device, a database into a first partition and a second partition,
        wherein the partitioning is based on one or more first characteristics associated with the first input biometric sample and one or more second characteristics associated with the second input biometric sample,
        the first partition being associated with a first set of biometric records, of a plurality of biometric records stored in the database, and
        the second partition being associated with a second set of biometric records, of the plurality of biometric records, the second set of biometric records being different from the first set of biometric records;

determining, by the processing device and based on a first matching process, whether the first input biometric sample matches a first reference biometric sample associated with a first biometric record included in the first set of biometric records;

determining, by the processing device and based on a second matching process, whether the second input biometric sample matches a second reference biometric sample associated with a second biometric record included in the second set of biometric records; and determining, by the processing device, that one of the first biometric record or the second biometric record is associated with the individual based on a result of the first matching process and a result of the second matching process.

* * * * *